(12) United States Patent
Neumann et al.

(10) Patent No.: US 10,697,338 B2
(45) Date of Patent: Jun. 30, 2020

(54) EXHAUST SYSTEM

(71) Applicant: Eberspächer Exhaust Technology GmbH & Co. KG, Neunkirchen (DE)

(72) Inventors: Felix Neumann, Aichwald (DE); Alexander Kauderer, Kuchen (DE); Wolfgang Datz, Tübingen (DE); Philip Weinmann, Esslingen (DE); Simon Krammer, Winnenden (DE); Andreas Sauer, Eislingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 256 days.

(21) Appl. No.: 15/861,815

(22) Filed: Jan. 4, 2018

(65) Prior Publication Data

US 2018/0187584 A1 Jul. 5, 2018

(30) Foreign Application Priority Data

Jan. 5, 2017 (DE) .................. 10 2017 100 167
Feb. 1, 2017 (DE) .................. 10 2017 101 923

(51) Int. Cl.
*F01N 3/02* (2006.01)
*F01N 3/10* (2006.01)
(Continued)

(52) U.S. Cl.
CPC ............. *F01N 3/035* (2013.01); *F01N 3/021* (2013.01); *F01N 3/0234* (2013.01); *F01N 3/103* (2013.01); *F01N 3/106* (2013.01); *F01N 3/2006* (2013.01); *F01N 3/2066* (2013.01); *F01N 3/2882* (2013.01); *F01N 5/02* (2013.01);
(Continued)

(58) Field of Classification Search
CPC ........ F01N 3/021; F01N 3/0234; F01N 3/103; F01N 3/106; F01N 3/035; F01N 3/2006; F01N 3/2066; F01N 3/2882; F01N 11/002; F01N 13/08; F01N 13/14; F01N 13/0097; F01N 5/02; F01N 2610/02; F01N 2610/03; F01N 2250/02; F01N 2470/00; F01N 2470/08; F01N 2560/06; F01N 2410/06;
(Continued)

(56) References Cited

U.S. PATENT DOCUMENTS 3,972,685 A 8/1976 Hanaoka
5,033,264 A 7/1991 Cabral
(Continued)

FOREIGN PATENT DOCUMENTS

CH 686 149 A5 1/1996
CN 205663491 U 10/2016
(Continued)

*Primary Examiner* — Audrey K Bradley
*Assistant Examiner* — Dapinder Singh
(74) *Attorney, Agent, or Firm* — McGlew and Tuttle, P.C.

(57) ABSTRACT

An exhaust system for an internal combustion engine, especially diesel internal combustion engine, includes an exhaust gas flow duct (12). At least one exhaust gas treatment unit (23, 26, 28, 30) is provided in an exhaust gas treatment duct area (16) of the exhaust gas flow duct (12). The exhaust gas treatment duct area (16) of the exhaust gas flow duct (12) extends, in at least some areas, in an insulation volume (20), through which exhaust gas discharged from the exhaust gas treatment duct area (16) can flow.

20 Claims, 1 Drawing Sheet

(51) Int. Cl.
  *F01N 3/20* (2006.01)
  *F01N 5/02* (2006.01)
  *F01N 11/00* (2006.01)
  *F01N 13/00* (2010.01)
  *F01N 3/035* (2006.01)
  *F01N 13/08* (2010.01)
  *F01N 13/14* (2010.01)
  *F01N 3/021* (2006.01)
  *F01N 3/28* (2006.01)
  *F01N 3/023* (2006.01)
  *F01N 3/24* (2006.01)

(52) U.S. Cl.
  CPC ........ *F01N 11/002* (2013.01); *F01N 13/0097* (2014.06); *F01N 13/08* (2013.01); *F01N 13/14* (2013.01); *F01N 3/24* (2013.01); *F01N 2240/36* (2013.01); *F01N 2250/02* (2013.01); *F01N 2260/08* (2013.01); *F01N 2410/06* (2013.01); *F01N 2470/00* (2013.01); *F01N 2470/08* (2013.01); *F01N 2560/06* (2013.01); *F01N 2610/02* (2013.01); *F01N 2610/03* (2013.01); *Y02T 10/16* (2013.01); *Y02T 10/24* (2013.01); *Y02T 10/26* (2013.01)

(58) Field of Classification Search
  CPC .. F01N 2260/08; F01N 2240/36; Y02T 10/24; Y02T 10/26

USPC .................................. 60/274, 277, 286, 295
  See application file for complete search history.

(56) References Cited

U.S. PATENT DOCUMENTS

| | | | |
|---|---|---|---|
| 5,345,762 A * | 9/1994 | Lutze | F01N 3/2006 422/177 |
| 2012/0014843 A1 | 1/2012 | Birkby et al. | |
| 2013/0136675 A1 * | 5/2013 | Eigenberger | F01N 3/2892 423/212 |

FOREIGN PATENT DOCUMENTS

| | | |
|---|---|---|
| DE | 42 05 328 A1 | 9/1992 |
| DE | 198 17 342 A1 | 11/1998 |
| DE | 10 2008 014 437 A1 | 3/2009 |
| EP | 2 557 288 A1 | 2/2013 |
| FR | 2 775 497 A1 | 9/1999 |
| JP | S6014221 U | 1/1985 |
| JP | H0317121 U | 2/1991 |
| JP | 2003120260 A | 4/2003 |
| JP | 2014194204 A | 10/2014 |
| JP | 6 256 255 B2 | 1/2018 |
| WO | 2012/145298 A2 | 10/2012 |

* cited by examiner

EXHAUST SYSTEM

CROSS REFERENCE TO RELATED APPLICATIONS

This application claims the benefit of priority under 35 U.S.C. § 119 of German Applications DE 10 2017 100 167.0, filed Jan. 5, 2017 and DE 10 2017 101 923.5, filed Feb. 1, 2017, the entire contents of which are incorporated herein by reference.

FIELD OF THE INVENTION

The present invention pertains to an exhaust system for an internal combustion engine, which can preferably be used in diesel internal combustion engines used in commercial vehicles or passenger cars.

BACKGROUND OF THE INVENTION

Various exhaust gas treatment units, for example, catalytic converter devices or particle filters, are used in such exhaust systems to reduce the emission of pollutants. Catalytic converter devices must have, in particular, a temperature in the range of at least 200° C. to 250° C. for an efficient conversion of the pollutants being transported in the combustion waste gases. Such a high temperature further reliably guarantees the evaporation of a urea solution injected as a reactant into the exhaust gas stream for a selective catalytic reduction. Since the catalytic converter devices, through or around which no combustion flow gases have flowed before, will have a temperature markedly below such an activation temperature, above all at the beginning of the operation of an internal combustion engine, the exhaust gas stream is emitted essentially untreated and with a high percentage of pollutants until the necessary temperatures are reached in the area of the catalytic converter devices. Increasingly strict legal requirements shorten the duration during which such a high percentage of pollutants is allowed.

SUMMARY OF THE INVENTION

An object of the present invention is to provide an exhaust system for an internal combustion engine, especially diesel internal combustion engine, with which the emission of pollutants can be reduced with a simple configuration.

This object is accomplished according to the present invention by an exhaust system for an internal combustion engine, especially diesel internal combustion engine, comprising an exhaust gas flow duct, wherein at least one exhaust gas treatment unit is provided in an exhaust gas treatment duct area of the exhaust gas flow duct, wherein the exhaust gas treatment duct area of the exhaust gas flow duct extends, in at least some areas, in an insulation volume, through which exhaust gas being discharged from the exhaust gas treatment duct area can flow.

The exhaust system configured according to the present invention utilizes the heat still being transported in the exhaust gas stream also after the flow through the exhaust gas treatment duct area to achieve an improved heat insulation and to heat more rapidly the system area in which an exhaust gas treatment shall take place. This leads, especially during a start phase of the operation, to a markedly shorter duration of the period until temperatures that guarantee efficient exhaust gas treatment are reached. The residual heat still being transported in the exhaust gases after flowing through the exhaust gas treatment duct area can also be used, if this is necessary, during the operation of an internal combustion engine in order to protect the system areas of the exhaust system that require a comparatively high temperature for the efficient exhaust gas treatment.

It is proposed for an efficient utilization of the residual heat being transported in the exhaust gases emitted by an internal combustion engine that the entire exhaust gas treatment duct area of the exhaust gas flow duct extend essentially in the insulation volume.

Optionally, to make it possible to use the heat being transported in the exhaust gases to heat exhaust gas treatment units or, if this is not necessary, to remove it into the surrounding area, the exhaust gas treatment duct area is open to an exhaust gas inlet area of the insulation volume and to an exhaust gas discharge duct area of the exhaust gas flow duct.

The exhaust gas stream may now be divided, for example, by a closing unit adjustable for closing and releasing the exhaust gas discharge duct area being provided in association with the exhaust gas discharge duct area. This closing unit may comprise a closing flap adjustable between a closed position essentially closing said exhaust gas discharge duct area and a released position releasing this duct area for the flow. The closing flap may preferably also be positioned in all intermediate positions between the closed position and the released position.

To release the exhaust gases flowing through the exhaust system to the surrounding area or to system areas following same in the flow direction, for example, to an exhaust muffler, regardless of whether or not the residual heat being transported in the exhaust gases was utilized, it is proposed that the insulation volume and the exhaust gas discharge duct area be open to an exhaust gas removal duct area of the exhaust gas flow duct.

An oxidation catalytic converter device or/and exhaust gas treatment duct area or/and an SCR (Selective Catalytic Reduction) catalytic converter device or/and an ammonia slip catalyst may be provided in the exhaust gas treatment duct area for an efficient exhaust gas treatment.

To make it possible to achieve the selective catalytic reduction to be carried out in the area of the SCR catalytic converter device in case an oxidation catalytic converter device and an SCR catalytic converter device are provided as exhaust gas treatment units, it is proposed that the SCR catalytic converter device be arranged downstream of the oxidation catalytic converter device and that a reactant injection device be arranged downstream of the oxidation catalytic converter device and upstream of the SCR catalytic converter device.

Since the flow resistance of the exhaust system shall be kept as low as possible in operating states in which an additional heating of one or more exhaust gas treatment units is not necessary, it is proposed, in order to provide information that or whether such an operating state is present, that a temperature sensor be provided in association with at least one exhaust gas treatment unit.

The information provided by such a temperature sensor may advantageously be used in an exhaust system according to the present invention by providing an actuating drive actuated by an actuating unit in association with the closing unit, wherein the actuating unit is configured to actuate the actuating drive based on the output signal of at least one temperature sensor associated with an exhaust gas treatment unit.

A compact design of the exhaust system according to the present invention can be achieved by the exhaust gas treatment duct area of the exhaust gas flow duct comprising a first duct section, a second duct section and a third duct section connecting the first duct section to the second duct section, wherein at least one exhaust gas treatment unit each is provided in the first duct section and in the second duct section, and an exhaust gas main flow direction in the first duct section is directed essentially in an exhaust gas main flow direction in the second duct section, and an exhaust gas main flow direction in the third duct section is directed essentially opposite the exhaust gas main flow direction in the first duct section and in the second duct section. The first duct section and the second duct section are preferably arranged here essentially in a fully overlapping manner in the exhaust gas main flow direction in the first duct section and in the second duct section.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
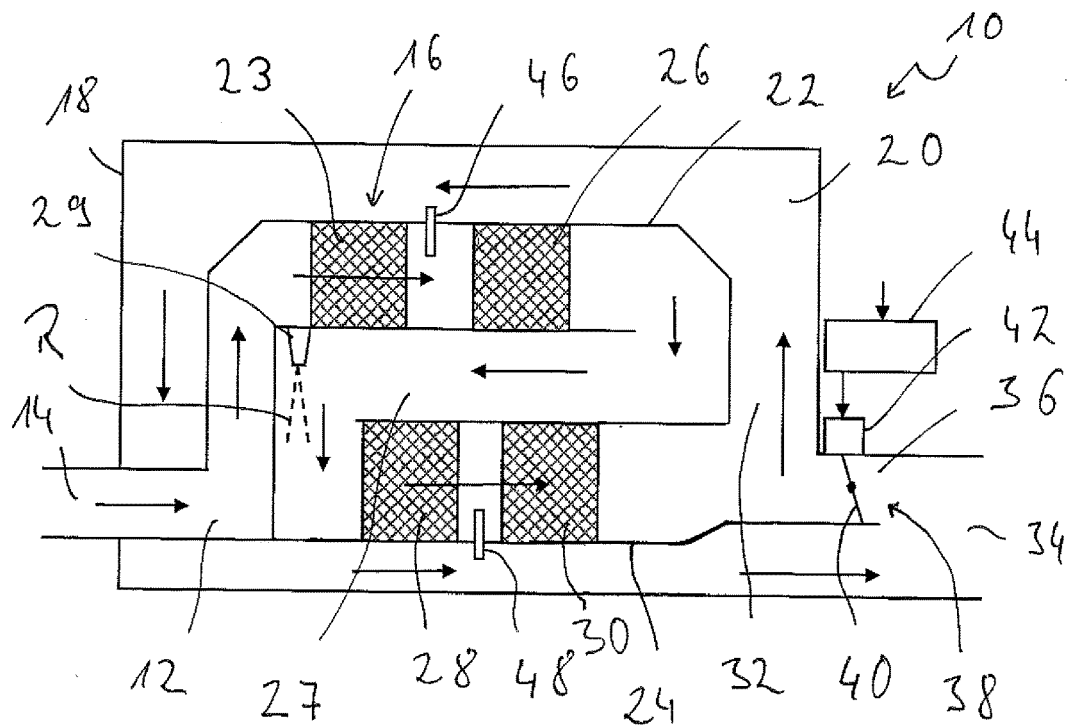
FIG. 1 is a schematic diagram of an exhaust system in an operating state in which exhaust gases flowing through the exhaust system are used for improved insulation of exhaust gas treatment units.

Referring to the drawings, an exhaust system to be used, for example, in connection with a diesel internal combustion engine is generally designated by 10 in FIG. 1. The exhaust system 10 shown in a schematic diagram in FIG. 1 comprises an exhaust gas flow duct 12, which is configured with one or more pipes or pipe sections, and which leads with an exhaust gas introduction duct area 14 to an exhaust gas treatment duct area generally designated by 16. The exhaust gas introduction duct area 14 may be a diesel internal combustion engine exhaust gas introduction connection, which is connected to a diesel internal combustion engine. The exhaust gas treatment duct area 16 is arranged in an insulation volume 20, which is formed, for example, in a housing 18.

The exhaust gas treatment duct area 16 comprises a first duct section 22, in which a diesel oxidation catalytic converter device 23 and a diesel particle filter device 26 are arranged following one another in the flow direction. In a second duct section 24, which is positioned downstream of the first duct section 22 and which is connected to the first duct section 22 via a third duct section 27, an SCR catalytic converter device 28 and an ammonia slip catalyst 30 are arranged following one another in the flow direction. To make it possible to carry out the selective reduction at the SCR catalytic converter device 28, a reactant injection device 29, generally also called injector, is provided upstream therefrom and preferably downstream in relation to the diesel oxidation catalytic converter device 23 and the diesel particle filter device 26. This reactant injection device may be positioned, for example, in the third duct section 27 in order to inject reactant R, for example, a urea/water solution, into the exhaust gas flowing there, and to mix it with this reactant R.

The exhaust gas treatment duct area 16 configured with the diesel oxidation catalytic converter device 23, with the diesel particle filter device 26, with the SCR catalytic converter device 28 and with the ammonia slip catalyst 30 as exhaust gas treatment units is arranged with its three duct sections 22, 24, 27 such that these are located basically parallel to one another and that an exhaust gas main flow direction in the first duct section 22 and in the second duct section 24 are essentially parallel to one another and are directed in the same direction, while an exhaust gas main flow direction in the third duct section 27 is directed essentially opposite the exhaust gas main flow direction in the first duct section 22 or in the second duct section 24. A meandering configuration of the exhaust gas treatment duct area 16 is thus obtained especially in the areas in which exhaust gas treatment units are arranged, which contributes to a very compact design, which can be accommodated especially in a correspondingly compactly designed housing 18 such that the exhaust gas flowing through the insulation volume can flow around the exhaust gas treatment duct area 16 in at least some areas and preferably essentially completely. Additional flow guide elements, which are not shown in FIG. 1 and which ensure that the exhaust gas leaving the exhaust gas treatment duct area and entering the insulation volume 20 in an exhaust gas inlet area 32 is guided along the entire outer surface of the exhaust gas treatment duct area 16 before it leaves the insulation volume towards an exhaust gas removal duct area 34, may be provided to this end. It is noted that other arrangements in space of the duct sections containing the different exhaust gas treatment units, for example, such that they follow one another, for example, essentially linearly, may also be provided.

Figure 2:
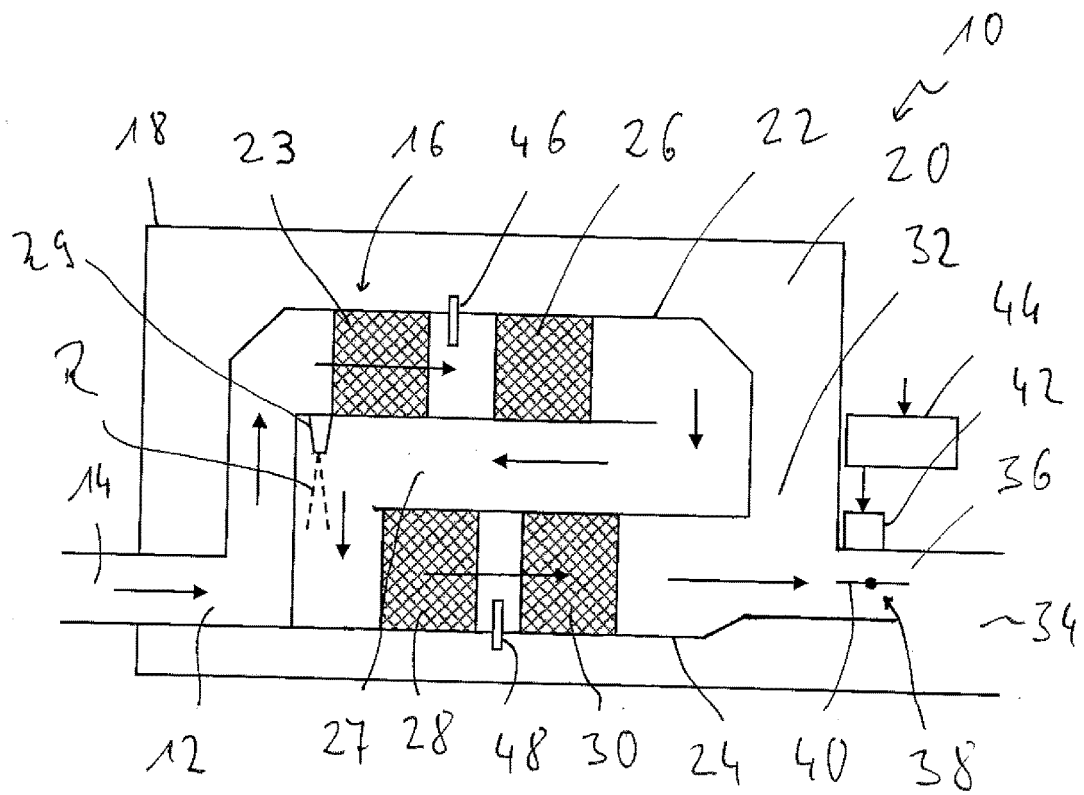
FIG. 2 is a schematic diagram corresponding to FIG. 1, wherein the exhaust system is in an operating state in which exhaust gases flowing through the exhaust system are not used to insulate exhaust gas treatment units.

A closing unit 38 generally designated by 38 is provided in association with an exhaust gas discharge duct area 36 connecting the exhaust gas treatment duct area 16 to the exhaust gas removal duct area 34. This closing unit 38 comprises a closing flap 40, which is positioned in the exhaust gas discharge duct area 36 and which is adjustable between a closed position shown in FIG. 1 and a released position shown in FIG. 2. An actuating drive 42, which is operated, for example, by an electric motor and which adjusts the closing flap 40 between the closed position according to FIG. 1 and the released position according to FIG. 2 and which can also be brought into and held in intermediate positions between these two positions, is associated to this end with the closing flap 40.

The exhaust system 10 further comprises a plurality of temperature sensors, which can detect the temperature of the exhaust gas flowing through the exhaust gas flow duct 12 in different positions, and optionally also the temperature of a number of different exhaust gas treatment units. For example, a temperature sensor 46 is provided, for example, downstream of the diesel oxidation catalytic converter device 23. A temperature sensor 48 is provided downstream of the SCR catalytic converter device. The temperature sensors 46, 48 and optionally also additional temperature sensors provided in other positions feed their signals representing the respective temperatures detected by these into the actuating unit 44, which actuates, based on these signals, the actuating drive 42 for adjusting or holding the closing flap 40 into or in a predefined position. Other variables characterizing the operation, for example, the pressure or the exhaust gas composition, may also be taken into consideration in the actuation of the closing flap 40.

By closing the exhaust gas discharge duct area 36 by means of the closing flap 40, it can be ensured with the exhaust system 10 configured according to the present invention, for example, when the operation of an internal combustion engine is started and the exhaust system 10 itself as well as the exhaust gases leaving the internal combustion engine still have a comparatively low temperature, that the combustion waste gases leaving the internal combustion engine cannot directly enter the exhaust gas removal duct area 34 after flowing through the exhaust gas treatment duct area 16. The exhaust gases leaving the exhaust gas treatment duct area 16 and still containing residual heat are rather sent by the closing flap 40 positioned in its closed position into the insulation volume 20, where they flow around the exhaust gas treatment duct area 16 on the outer side thereof and contribute in the process to an improved heat insulation especially of the exhaust gas treatment units provided therein in order to avoid heat losses to the outside and optionally also heat the exhaust gas treatment units from the outside if, for example, these exhaust gas treatment units are not yet heated at first by exhaust gases. It is only after flowing through the insulation volume 20 that the exhaust gases, which are markedly cooled further, are discharged from the insulation volume 20 towards the exhaust gas removal duct area 34.

This state can be maintained as long as or can then be set as long as it is detected by means of one or more temperature sensors 46, 48 that the exhaust gas treatment duct area 16 and especially one or more of the exhaust gas treatment units provided therein still have such a low temperature that an efficient exhaust gas treatment is not yet guaranteed. If the temperature in the area of the exhaust gas treatment duct area 16, especially in the area of the different catalytic converter devices, reaches a temperature level that is in the range of 200° C. to 250° C. or higher and thus guarantees that catalytic reactions can be carried out efficiently in the different catalytic converter devices, the closing flap 40 can be adjusted in the direction of its released position shown in FIG. 2 in order to make possible the discharge of the exhaust gases leaving the exhaust gas treatment duct area 16 via the exhaust gas discharge duct area 36. Since the flow path over the exhaust gas discharge duct area 36 has a markedly lower flow resistance than does the flow path through the insulation volume 20, essentially the entire exhaust gas stream leaving the exhaust gas treatment duct area 16 will flow into the exhaust gas removal duct area 34 via the exhaust gas discharge duct area 36 when the closing flap 40 is positioned in its released position. Even when there is no flow of exhaust gas through the insulation volume 20 after sufficient heating of the exhaust gas treatment units, insulation volume 20 forms an air volume contributing to an improved heat insulation of the exhaust gas treatment units.

If a state occurs during the operation of a vehicle equipped with such an exhaust system 10 in which the temperature in the area of one or more of the exhaust gas treatment units drops to a value at which it cannot be guaranteed any longer that the catalytic reaction can be carried out efficiently, for example, during prolonged operation of an internal combustion engine in a low-load state, the closing flap 40 can again be adjusted in the direction of its closed position in order to ensure that at least a part of the exhaust gas stream leaving the exhaust gas treatment duct area 16 is sent again through the insulation volume 20 in order to avoid a further cooling of the exhaust gas treatment units arranged in the exhaust gas treatment duct area 16 by an improved thermal uncoupling of the exhaust gas treatment units from the comparatively cold surrounding area and to ensure that the exhaust gas treatment units arranged in the exhaust gas treatment duct area 16 be maintained by these exhaust gases flowing through at a temperature necessary for the operation of the exhaust gas treatment units in this operating state as well.

It should finally be noted that the principles of the present invention may, of course, also be applied in an exhaust system having a different configuration. For example, the duct sections 22, 24, may thus be arranged that they form a continuation of one another, i.e., are not arranged overlapping one another in the exhaust gas main flow direction. The exhaust gas treatment units to be provided in the exhaust gas treatment duct area may also be selected independently from the internal combustion engine to be operated in conjunction with such an exhaust system.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine, the exhaust system comprising:
 an exhaust gas flow duct with an exhaust gas treatment duct area;
 at least one exhaust gas treatment unit provided in the exhaust gas treatment duct area of the exhaust gas flow duct; and
 structure defining an insulation volume, wherein the exhaust gas treatment duct area of the exhaust gas flow duct extends, in at least some areas, in the insulation volume, through which insulation volume exhaust gas, discharged from the exhaust gas treatment duct area, can flow, the exhaust gas treatment duct area being open towards an exhaust gas inlet area of the insulation volume and the exhaust gas treatment duct area being open towards an exhaust gas discharge duct area of the exhaust gas flow duct, the exhaust gas flow duct having an exhaust gas removal duct area, the insulation volume and the exhaust gas discharge duct area being open towards the exhaust gas removal duct area of the exhaust gas flow duct, wherein a closing unit is provided in association with the exhaust gas discharge duct area, the closing unit being adjustable for closing and releasing the exhaust gas discharge duct area.

2. The exhaust system in accordance with claim 1, wherein the entire exhaust gas treatment duct area of the exhaust gas flow duct extends essentially in the insulation volume.

3. The exhaust system in accordance with claim 1, wherein the closing unit comprises a closing flap arranged in the exhaust gas discharge duct area and adjustable between a closed position essentially closing the exhaust gas discharge duct area against flow and a released position releasing the exhaust gas discharge duct area for flow.

4. The exhaust system in accordance with claim 1, wherein the at least one exhaust gas treatment unit comprises:
 an oxidation catalytic converter device; or
 a particle filter device; or
 an SCR catalytic converter device; or
 an ammonia slip catalyst; or
 any combination of an oxidation catalytic converter device and a particle filter device and an SCR catalytic converter device and an ammonia slip catalyst.

5. The exhaust system in accordance with claim 4, wherein:
   the at least one exhaust gas treatment unit comprises the oxidation catalytic converter device and the SCR catalytic converter device;
   the SCR catalytic converter device is arranged downstream of the oxidation catalytic converter device and a reactant injection device is arranged downstream of the oxidation catalytic converter device and upstream of the SCR catalytic converter device.

6. The exhaust system in accordance with claim 1, further comprising at least one temperature sensor provided in association with the at least one exhaust gas treatment unit.

7. The exhaust system in accordance with claim 6, further comprising:
   an actuation unit; and
   an actuating drive actuated by the actuation unit, wherein the closing unit is adjustable by the actuating drive for closing and releasing the exhaust gas discharge duct area of the exhaust gas flow duct
   based on the output signal of the at least one temperature sensor.

8. The exhaust system in accordance with claim 1, wherein the exhaust gas treatment duct area of the exhaust gas flow duct comprises:
   a first duct section;
   a second duct section; and
   a third duct section connecting the first duct section to the second duct section, wherein:
   the at least one exhaust gas treatment unit is provided in the first duct section and another exhaust gas treatment unit is provided in the second duct section;
   an exhaust gas main flow direction in the first duct section is directed essentially in the same direction as an exhaust gas main flow direction in the second duct section; and
   an exhaust gas main flow direction in the third duct section is directed essentially opposite the exhaust gas main flow direction in the first duct section and in the second duct section.

9. An exhaust system in accordance with claim 8, wherein the first duct section and the second duct section overlap each other completely in the exhaust gas main flow direction in the first duct section and in the second duct section.

10. The exhaust system in accordance with claim 8, further comprising a diesel internal combustion engine exhaust gas introduction connection.

11. An exhaust system for an internal combustion engine, the exhaust system comprising:
   an exhaust gas structure defining an exhaust gas flow duct with an exhaust gas treatment duct area;
   a gas treatment unit provided in the exhaust gas treatment duct area of the exhaust gas flow duct;
   a housing defining an insulation volume, wherein the exhaust gas treatment duct area of the exhaust gas flow duct extends, in at least some areas, in the insulation volume, through which insulation volume exhaust gas, discharged from the exhaust gas treatment duct area, can flow;
   a closing unit adjustable between a closed position and an open position, the closing unit being arranged between a portion of the exhaust gas structure and a portion of the housing, the portion of the exhaust gas structure and another portion of the housing defining an outlet area of the insulation volume, the outlet area of the insulation volume being adjacent to the closing unit.

12. The exhaust system in accordance with claim 11, wherein the exhaust gas treatment duct area is open towards an exhaust gas inlet area of the insulation volume and the exhaust gas treatment duct area is open towards an exhaust gas discharge duct area of the exhaust gas flow duct, the exhaust gas flow duct having an exhaust gas removal duct area, the insulation volume and the exhaust gas discharge duct area being open towards the exhaust gas removal duct area of the exhaust gas flow duct, wherein the closing unit is provided in association with the exhaust gas discharge duct area, the closing unit being adjustable for closing and releasing the exhaust gas discharge duct area.

13. The exhaust system in accordance with claim 12, wherein the exhaust gas treatment unit comprises:
   an oxidation catalytic converter device; or
   a particle filter device; or
   an SCR catalytic converter device; or
   an ammonia slip catalyst; or
   any combination of an oxidation catalytic converter device and a particle filter device and an SCR catalytic converter device and an ammonia slip catalyst.

14. The exhaust system in accordance with claim 13, wherein:
   the at least one exhaust gas treatment unit comprises the oxidation catalytic converter device and the SCR catalytic converter device;
   the SCR catalytic converter device is arranged downstream of the oxidation catalytic converter device and a reactant injection device is arranged downstream of the oxidation catalytic converter device and upstream of the SCR catalytic converter device.

15. The exhaust system in accordance with claim 12, further comprising at least one temperature sensor provided in association with the at least one exhaust gas treatment unit.

16. The exhaust system in accordance with claim 15, further comprising:
   an actuation unit; and
   an actuating drive actuated by the actuation unit, wherein the closing unit is adjustable by the actuating drive for closing and releasing the exhaust gas discharge duct area of the exhaust gas flow duct based on the output signal of the at least one temperature sensor.

17. The exhaust system in accordance with claim 12, wherein the exhaust gas treatment duct area of the exhaust gas flow duct comprises:
   a first duct section;
   a second duct section; and
   a third duct section connecting the first duct section to the second duct section, wherein:
   the at least one exhaust gas treatment unit is provided in the first duct section and another exhaust gas treatment unit is provided in the second duct section;
   an exhaust gas main flow direction in the first duct section is directed essentially in the same direction as an exhaust gas main flow direction in the second duct section;
   an exhaust gas main flow direction in the third duct section is directed essentially opposite the exhaust gas main flow direction in the first duct section and in the second duct section;
   the third duct section is arranged between the second duct section and the first duct section.

18. An exhaust system for an internal combustion engine, the exhaust system comprising:
   an exhaust gas structure defining an exhaust gas flow duct with an exhaust gas treatment duct area;

a gas treatment unit provided in the exhaust gas treatment duct area of the exhaust gas flow duct;

a housing defining an insulation volume, wherein the exhaust gas treatment duct area of the exhaust gas flow duct extends, in at least some areas, in the insulation volume; and a closing unit adjustable between a closed position and an open position, the closing unit defining an exhaust gas outlet when the closing unit is in the open position, the exhaust gas outlet and the exhaust gas structure defining a first fluid flow path when the closing unit is in the open position, the exhaust gas structure and the insulation volume defining a second fluid flow path when the closing unit is in the closed position, the second fluid flow path comprising a second fluid flow path outlet, the second fluid flow path outlet being adjacent to the exhaust gas outlet.

19. The exhaust system in accordance with claim 18, wherein the closing unit is arranged between a portion of the exhaust gas structure and a portion of the housing, the portion of the exhaust gas structure and another portion of the housing defining the second fluid flow path outlet, the second fluid flow path outlet being adjacent to the closing unit.

20. The exhaust system in accordance with claim 19, wherein the exhaust gas treatment duct area is open towards an exhaust gas inlet area of the insulation volume and the exhaust gas treatment duct area being open towards an exhaust gas discharge duct area of the exhaust gas flow duct, the exhaust gas flow duct having an exhaust gas removal duct area, the insulation volume and the exhaust gas discharge duct area being open towards the exhaust gas removal duct area of the exhaust gas flow duct, wherein the closing unit is provided in association with the exhaust gas discharge duct area, the closing unit being adjustable for closing and releasing the exhaust gas discharge duct area.

\* \* \* \* \*